Feb. 18, 1947.  F. R. FARROW, JR  2,416,166
CONTROL APPARATUS FOR MOTOR OPERATED DEVICE
Filed Jan. 29, 1944

Inventor:—
Frederick R. Farrow Jr.
by his attorneys
Howson and Howson.

Patented Feb. 18, 1947

2,416,166

UNITED STATES PATENT OFFICE 2,416,166

CONTROL APPARATUS FOR MOTOR OPERATED DEVICE

Frederick R. Farrow, Jr., Audubon, N. J., assignor, by mesne assignments, to Philco Corporation, Philadelphia, Pa., a corporation of Pennsylvania Application January 29, 1944, Serial No. 520,307

7 Claims. (Cl. 250—11)

This invention relates to a novel automatic switching mechanism. More particularly it relates to a mechanism for automatically reversing, periodically, the direction of operation of an electric device, such as a direct current motor; and also to means associated with such mechanism for varying the duration of operation in either direction.

One of the possible uses of the invention is as a means to operate and control sector scanning equipment in radio signaling systems. For example, the invention is applicable to radio detecting and ranging (radar) systems. It is customary in such systems to rotate a directional antenna by means of an electric motor whose direction of operation is controlled by a reversing switch. Heretofore by manual reversal of the control switch it was sometimes possible to obtain a measure of manually-controlled scanning of a certain desired sector. But, such methods required alert and constant attention and manual operation by the operator in charge.

It is an object of the present invention to provide improved mechanism for automatically reversing the current flow through a circuit to an electric device, such as, for example, a D. C. motor, after the current has flowed in one direction for a predetermined adjustable period, and to thereafter again reverse the flow of current after it has flowed for a predetermined adjustable period in the other direction.

It is well-known that D. C. motors do not run equally well in both forward and reverse directions, and therefore attempts to run a motor in each direction for an equal period results in the driven apparatus failing to return exactly to central or starting position. The tendency is to "creep" in the direction in which the motor runs best.

Therefore, another object of my invention is to provide means to control or counteract the tendency of a motor to "creep" in one direction when periodically reversed.

A further related object is to provide means not only to control the usual tendency to "creep" but also to create a positive "creep," of determinable amount, in either direction whereby the scope of the action of the controlled device may be varied to suit conditions.

Another object is to provide an improved automatic sector scanning equipment for radio signaling systems provided with means for "creep" control.

Another object is to provide an improved automatic sector scanning equipment for radio signaling systems, provided with means to progressively move the sector being scanned, at a rate that may be varied.

Other objects and advantages will become apparent as the invention is described in connection with the accompanying drawing.

In the drawing:

Figure 1 diagrammatically illustrates an apparatus embodying the invention;

Figure 1:
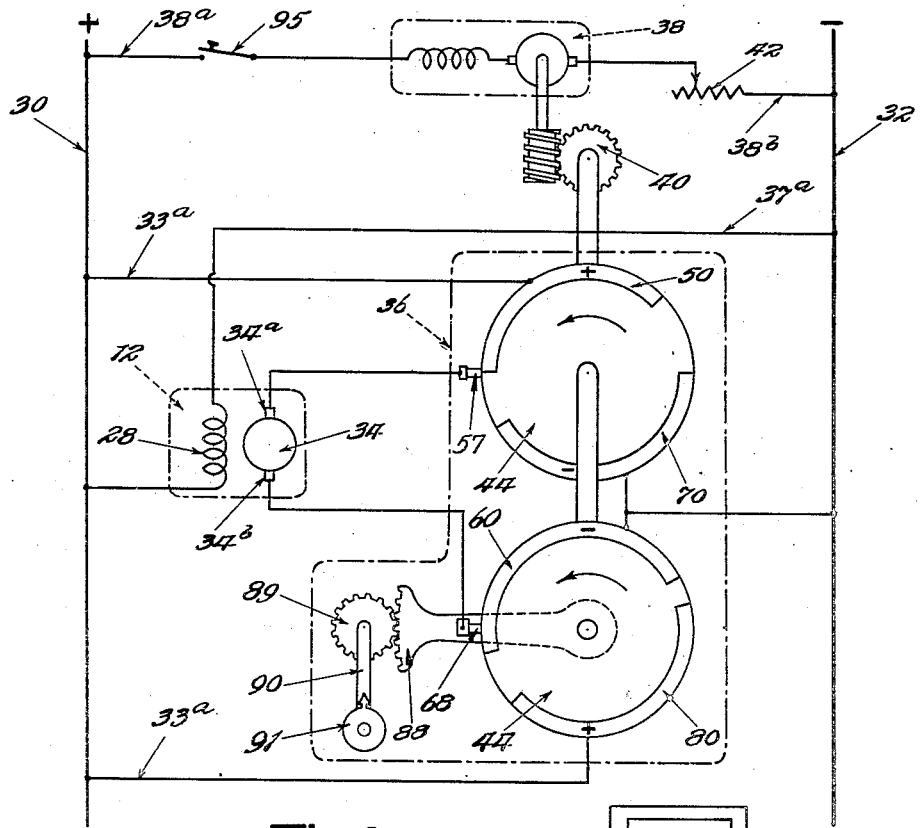

In the form of the invention illustrated, a directional radio antenna 10 of known form and construction is rotatable and oscillatable by a controlled direct current electric motor 12 through reduction gearing 14 of any suitable form. For example, a worm gear 16 on the motor shaft may drive small spur gears 20—22, the gear 22 meshing with and driving a large spur gear 24 which turns as a unit with the antenna 10 about a vertical axis 26.

The controlled motor 12 may be a shunt wound or other reversible type of motor whose field coil 28 is energized from D. C. power lines 30, 32. The supply of current to the armature 34 from lines 30, 32 is controlled and reversed through an automatic rotary switching device or reversing commutator 36.

For driving the switching device 36, a variable speed series wound or other suitable type of electric motor 38 may be connected with the device through gearing 40. By means of a series rheostat 42, the speed of the driving motor 38 may be varied at will.

Because it is needful, on occasion, to be able to run the controlled motor 12 continuously forward or backward, or periodically forward and backward, with the forward and reverse periods equal or different, the means provided to accomplish those ends must be flexible in operation. According to my invention, the switching device, which may be of the reversing commutator type, connects the armature brushes 34a and 34b of the controlled motor 12 to the power lines 30, 32 in a manner to cause current to flow alternately in one direction and then in the other.

Taking into consideration the unlike commutation conditions of reversible motors and the resulting "creep," I have provided means to compensate therefor; and, at the same time, I have developed and utilized the compensating means to enable the current reversal (and thus the forward and reverse movement of the motor) to be adjustably regulated for deliberately causing "creeping" in either forward or reverse directions, whereby the field of operation (in this particular instance the sector to be scanned by antenna 10) may be varied toward the right or left of the original sector.

Figure 3:
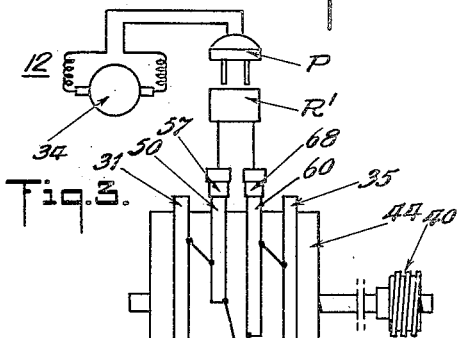
Figure 3 is a side elevational view of a commutator type switching mechanism forming part of the apparatus.
Figure 2:
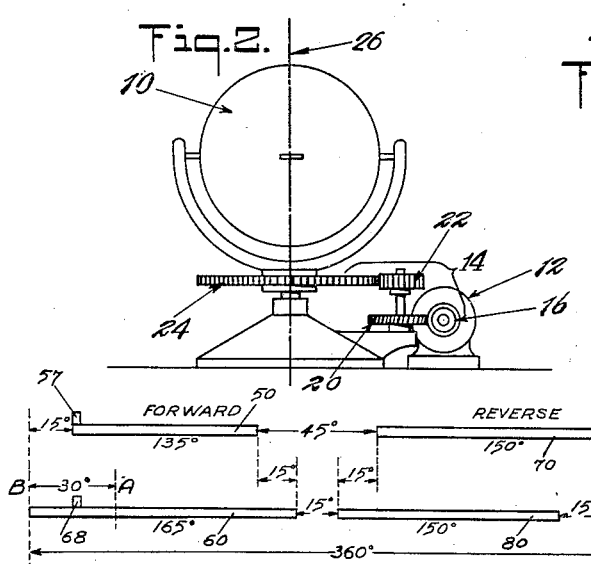
Figure 2 is an elevational view illustrating a directional radio antenna actuated by a reversible motor that is controlled and operated in accordance with the invention.

Specifically, the switching mechanism 36 may comprise a rotary commutator, consisting, for example, of a cylindrical insulating member 44 (see Figure 3) having conductive segments 50, 60, 70, 80 mounted thereon. The segments 50 and 80 are permanently connected to the positive power line 30 through a slip-ring and brush arrangement 31, 33, or other suitable connections. The segments 60 and 70 are permanently connected with the negative power line 32 by another slip ring and brush arrangement 35, 37, or other suitable connections.

Engageable with segments 50 and 70 alternately is a fixed brush 57 that is electrically connected with one motor-commutator brush 34a of the controlled motor 12, so as to alternately connect brush 34a to the negative and positive power lines 32 and 30 as segments 50 and 70 in turn come under fixed brush 57.

Engageable with segments 60 and 80 is a brush 68 which is electrically connected to the other motor commutator brush 34b so as to connect it alternately to the positive and negative lines.

In order that the period of reverse rotation may be varied to equal, or be greater or less than, the period of forward rotation, the segments 50, 60, 70 and 80 may be of various lengths and may have various locations on the cylinder 44; and the brush 68 is made adjustable. One possibility for achieving such adjustment is to mount the brush 68 on a segment gear 88 which meshes with a pinion 89 on a manually-rotatable shaft 90 having a control knob 91 for manipulation and adjustment. The segment gear 88 may be pivoted, by any suitable mechanical means, about the shaft carrying the cylindrical member 44.

An example of segment lengths in terms of arcs intercepted on the periphery of the insulating cylindrical or drum member 44 is:

| Segment— | Degrees |
|---|---|
| 50 | 135 |
| 60 | 165 |
| 70 | 150 |
| 80 | 150 |

Spacings between the ends of segments 50 and 70 may be 30° at one end and 45° at the other. Spacings between segments 60 and 80 may be 30° at one end and 15° at the other.

Figure 4:
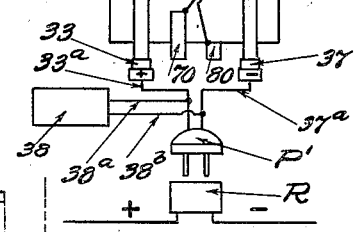
Figure 4 is a developed plan view of the contact segments of the device.

In Figure 4 there is shown a developed plan of the contact segments having the angular lengths and spacings indicated above, with the segments correlated as illustrated. As indicated above, the contact brush 57 is fixed, while the contact brush 68 is adjustable. Suppose, for example, that the brush 68 is adjustable through 30° between the extreme positions A and B. In the illustration the brush 68 is shown in its mid-position in which it is aligned with brush 57.

The operation of the device may be clearly seen by imagining a movement of the contact segments in Figure 4 toward the left, while the brushes 57 and 68 remain stationary. The segments 50 and 60 control the forward operation of motor 12, while segments 70 and 80 control the reverse operation. With brush 68 positioned as shown, it will be seen that the periods of forward and reverse operation will be equal. Expressed in terms of degrees, each period will be 135°. Assume now that brush 68 is moved to position B. The period of forward operation will still be 135°, while the period of reverse operation will be 150°. Now suppose that brush 68 is moved to position A. Then the period of forward operation will still be 135° but the period of reverse operation will be 120°.

Obviously, therefore, by the expedient of moving the adjustable element 68 to various positions between the extremes of its range, the directional antenna 10 or other apparatus operated by the motor 12 can be caused to rotate distances in reverse that are greater, lesser, or equal to the forward rotation. Thus, the normally expected "creep" can be compensated out, or forward or reverse "creep" of varying amount can be positively created, whereby the sector scanned by antenna 10 can be fixed or can be constantly varied toward the right or to the left, with the rate of variation (or "creep") also variable.

In case it is desired to change the scanning to an entirely different sector, the switching device 36 can be stopped while the controlled motor 12 is running in the proper direction by merely opening a manually-operable switch 95 in the circuit of the actuating motor 38. On reaching the selected sector the scanning movement may be continued by reclosing the switch 95. If the sector has been over-run or not fully reached, the "creep" control can be utilized by manipulating the knob 91 to cause "creeping" forward or backward until the desired sector is reached; and then a further manipulation may be made to cause the scanning to continue only over the desired sector, i. e., the "creep" is compensated to zero.

The switching device 36 may also be stopped for the purpose of causing continuous rotation or scanning throughout 360° by the antenna 10.

Heretofore scanning motors, such as 12, have been connected to the power lines by conventional detachable plug and receptacle connectors, the plug member being connected to the armature brushes of the motor and the receptacle being connected to the power line. An advantage of the present invention is that the conductors 33a, 37a (Figure 3) connected to the slip ring brushes 33, 37, and also the connections 38a, 38b for the motor 38, may terminate in an attachment plug P' (like that to which the motor 12 is connected), which may be plugged into the power line receptacle R to tap the power lines; and the conductors from the brushes 57, 68 may terminate in a conventional receptacle R' (similar to receptacle R) into which may be inserted the motor plug P.

By such an arrangement, the invention can be connected immediately to existing scanning apparatus to convert such apparatus from manual to automatic adjustable scanning without the necessity of changing the structure of the existing apparatus.

From the foregoing, it will be apparent that the reversing system described, although particularly applicable to and useful in control of a radio antenna scanning apparatus, is adaptable to other fields of use. Therefore, I do not limit the invention to the embodiment herein described. Many other modifications and uses will occur to those skilled in the art.

I claim:

1. A radio locating system comprising elements including a directional antenna structure rotatable about an axis, a reversible motor mechanically coupled to said antenna structure, means for automatically effecting forward and reverse operation of said motor during successive time intervals to thereby effect sector scanning of said antenna structure, said reversible motor having an inherent, objectionable predisposition to run better in one direction than in the other, said predisposition tending to cause said antenna structure to creep or drift away from a desired sector, and compensatory means for varying at will the relative durations of the periods of forward and reverse operation of said motor so as to maintain the desired sector scanning.

2. A radio locating system as claimed in claim 1, including rotary switching means for effecting the forward and reverse operation of said motor, and means for varying the rate of rotation of said switching means so as to vary the amplitude of the sector being scanned.

3. A radio locating system as claimed in claim 1, including rotary switching means for effecting the forward and reverse operation of said motor, and means for interrupting the rotation of said switching means at will to cause continued forward or reverse operation of said motor so as to change the sector to be scanned or to effect full circular scanning.

4. A radio locating system comprising elements including a directional antenna structure rotatable about an axis, a reversible direct current motor mechanically coupled to said antenna structure, means for automatically effecting forward and reverse operation of said motor during successive time intervals to thereby effect sector scanning of said antenna structure, said motor having an inherent objectionable predisposition to run better in one direction than in the other due to unlike commutation conditions, whereby said antenna structure tends to creep or drift away from a desired sector, and compensatory means for varying at will the relative durations of the periods of forward and reverse operation of said motor so as to maintain the desired sector scanning.

5. In combination, a rotatable scanning device to be actuated back and forth through a desired sector, a reversible motor connected to said device to drive the same, means including a power-driven switch mechanism for effecting reversal of operation of said motor to cause said device to be actuated through a desired sector, and means for stopping said switch mechanism at will to effect change of the sector through which said device is actuated.

6. In combination, a rotatable scanning device to be actuated back and forth through a desired sector, a reversible motor connected to said device to drive the same, means including a power-driven switch mechanism for effecting reversal of operation of said motor to cause said device to be actuated through a desired sector, means for adjusting said switch mechanism to vary the relative duration of forward and reverse operation of said motor so as to compensate for any creeping of said scanning device due to inherent tendency of said motor to run better in one direction than in the other, and means for stopping said switch mechanism at will to effect change of the sector through which said device is actuated.

7. In combination, a rotatable scanning device to be actuated back and forth through a desired sector, a reversible motor connected to said device to drive the same, means including a power-driven switch mechanism for effecting reversal of operation of said motor to cause said device to be actuated through a desired sector, means for varying the speed of operation of said switch mechanism to vary the amplitude of the sector through which said device is actuated, means for adjusting said switch mechanism to vary the relative duration of forward and reverse operation of said motor so as to compensate for any creeping of said scanning device due to inherent tendency of said motor to run better in one direction than in the other, and means for stopping said switch mechanism at will to effect change of the sector through which said device is actuated.

FREDERICK R. FARROW, Jr.

REFERENCES CITED

The following references are of record in the file of this patent:

UNITED STATES PATENTS

| Number | Name | Date |
|---|---|---|
| 2,074,599 | Todd | Mar. 23, 1937 |
| 2,310,335 | Wolfson | Feb. 9, 1943 |